(12) United States Patent
Cowley et al.

(10) Patent No.: US 9,343,963 B2
(45) Date of Patent: May 17, 2016

(54) DUAL MODE VOLTAGE REGULATOR WITH DYNAMIC RECONFIGURATION CAPABILITY

(75) Inventors: Nicholas P. Cowley, Wroughton (GB); Andrew D. Talbot, Chieveley (GB); Isaac Ali, Mississauga (CA); Keith Pinson, Swindon (GB); Colin L. Perry, Swindon (GB); Matthew T. Aitken, Swindon (GB); Chi Man Kan, Swindon (GB); Mark S. Mudd, Wootton Bassett (GB); Stephen J. Spinks, Swindon (GB); Alan J. Martin, Plymouth (GB); William L. Barber, Bampton (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/994,810

(22) PCT Filed: Dec. 22, 2011

(86) PCT No.: PCT/US2011/066866
§ 371 (c)(1),
(2), (4) Date: Jul. 7, 2014

(87) PCT Pub. No.: WO2013/095514
PCT Pub. Date: Jun. 27, 2013

(65) Prior Publication Data
US 2015/0035507 A1 Feb. 5, 2015

(51) Int. Cl.
*H02M 3/156* (2006.01)
*G05F 1/46* (2006.01)
(Continued)

(52) U.S. Cl.
CPC ............... *H02M 3/156* (2013.01); *G05F 1/46* (2013.01); *H02M 3/158* (2013.01); *H02M 2001/0045* (2013.01)

(58) Field of Classification Search
CPC ..... H02M 3/156; H02M 3/1588; H02M 3/157
USPC .......................................... 323/224, 282–285
See application file for complete search history.

(56) References Cited

U.S. PATENT DOCUMENTS

| | | | |
|---|---|---|---|
| 6,031,362 A | 2/2000 | Bradley | |
| 6,150,798 A | 11/2000 | Ferry et al. | |

(Continued)

FOREIGN PATENT DOCUMENTS

| | | |
|---|---|---|
| DE | 102008008337 A1 | 4/2009 |
| JP | 2009-142097 A | 6/2009 |
| WO | 2013/130088 A1 | 9/2013 |

OTHER PUBLICATIONS

International Search Report and Written Opinion received for PCT Application No. PCT/US2012/027343, mailed on Nov. 29, 2012, 12 Pages.

(Continued)

*Primary Examiner* — Adolf Berhane
(74) *Attorney, Agent, or Firm* — Grossman, Tucker, Perreault & Pfleger, PLLC

(57) ABSTRACT

A dual mode voltage regulator according to one embodiment includes a passive regulator circuit; a switching regulator circuit; and a controller circuit configured to monitor operational parameters of the dual mode voltage regulator and selectively couple either the passive regulator circuit or the switching regulator circuit between an input voltage port and an output load. The selective coupling is based on the monitoring of parameters including current through the output load, voltage at the input voltage port and voltage at the output load as well as the availability of a system clock signal.

30 Claims, 5 Drawing Sheets

(51) Int. Cl.
*H02M 3/158* (2006.01)
*H02M 1/00* (2006.01)

(56) References Cited

U.S. PATENT DOCUMENTS

| | | |
|---|---|---|
| 7,148,670 B2 | 12/2006 | Inn et al. |
| 7,830,128 B2 | 11/2010 | Xu |
| 2002/0041178 A1 | 4/2002 | Hiraki et al. |
| 2003/0085694 A1 | 5/2003 | Lee |
| 2004/0027099 A1 | 2/2004 | Fujii |
| 2006/0158165 A1 | 7/2006 | Inn et al. |
| 2007/0080673 A1 | 4/2007 | Seliverstov |
| 2009/0278517 A1 | 11/2009 | Kleveland |
| 2010/0026250 A1 | 2/2010 | Petty |
| 2010/0026260 A1 | 2/2010 | Xu |
| 2011/0273104 A1 | 11/2011 | Uchimoto et al. |
| 2012/0187869 A1* | 7/2012 | Angelin et al. ............... 315/307 |
| 2015/0042295 A1* | 2/2015 | Cowley et al. ............... 323/269 |

OTHER PUBLICATIONS

Related PCT Application PCT/US2012/027343 filed Mar. 1, 2012.
Office Action received for German Patent Application No. 1120111060025, mailed on Feb. 13, 2015, 5 pages of English Translation and 9 pages of German Office Action.
International Preliminary Report on Patentability and Written Opinion received for PCT Patent Application No. PCT/US2011/066866, mailed on Jul. 3, 2014, 8 pages.
International Search Report and Written Opinion received for PCT Patent Application No. PCT/US2011/066866, mailed on Sep. 3, 2012, 11 pages.
International Preliminary Report on Patentability and Written Opinion received for PCT Patent Application No. PCT/US2012/027343, mailed on Sep. 12, 2014, 8 pages.

* cited by examiner

DUAL MODE VOLTAGE REGULATOR WITH DYNAMIC RECONFIGURATION CAPABILITY

FIELD

The present disclosure relates to voltage regulators, and more particularly, to dual mode voltage regulators with dynamic reconfiguration capability.

BACKGROUND

System on a Chip (SoC) architectures often require multiple voltage sources (or voltage rails) to meet the variety of operational power requirements imposed by the numerous components in the system such as, for example, various input/output (I/O) sub-systems. Existing solutions typically implement voltage regulators on the platform or circuit board which hosts the SoC integrated circuit (IC). Some of these voltage regulators may be passive regulators while others may be switched mode regulators, depending on the requirements of the sub-system to be powered as well as on the voltage available to the platform. This approach, however, consumes circuit board space and increases system complexity and power delivery cost.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides methods and apparatus to provide dual mode voltage regulation to a load with dynamic reconfiguration capability. The two modes may include a passive regulator mode and a switched regulator mode. A controller circuit may monitor operational parameters such as, for example, current through the output load, voltage at the input voltage port and voltage at the output load as well as the availability of a system clock signal. Based on this monitoring, the controller may selectively couple either the passive regulator or the switched mode regulator between the input voltage port and the output load to improve power conversion efficiency. In some embodiments the passive regulator circuit may share components with the switched mode regulator circuit including, for example, a power switch and an error amplifier.

Figure 1:
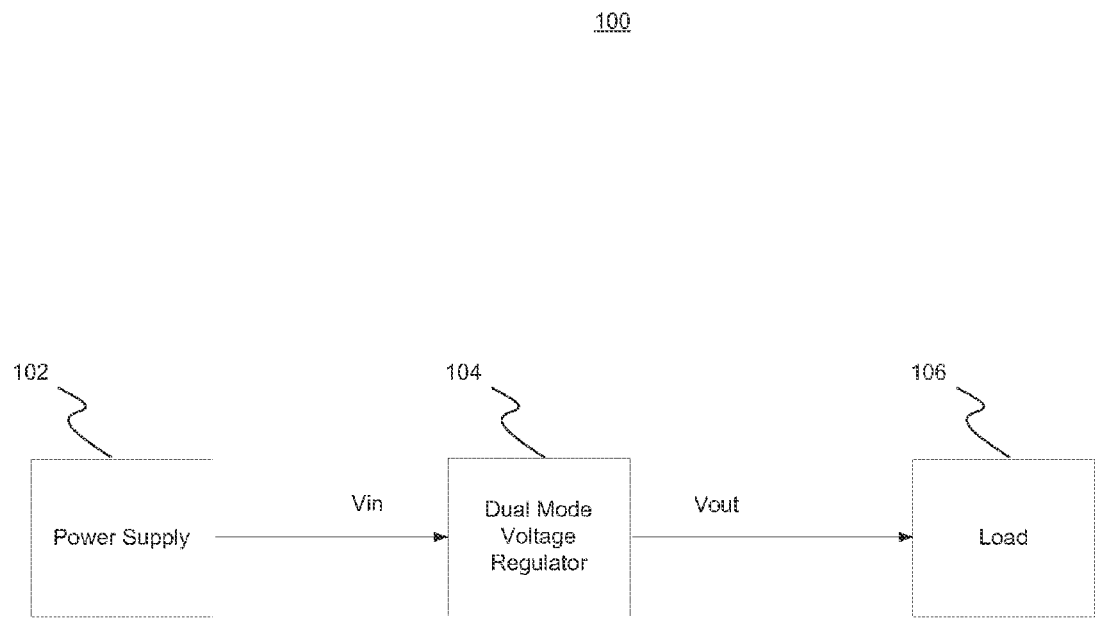
FIG. 1 illustrates a top level system diagram of one exemplary embodiment consistent with the present disclosure.

FIG. 1 illustrates a top level system diagram 100 of one exemplary embodiment consistent with the present disclosure. A power supply 102 provides input power at a direct current (DC) voltage level to a dual mode voltage regulator 104. Dual mode voltage regulator 104 converts the input DC voltage level to an output voltage level that meets the requirements of load 106 and provides power to load 106 at that converted voltage level. In sonic embodiments, multiple dual mode voltage regulators 104 may be integrated with a System on a Chip (SoC) architecture where multiple components are integrated on an IC and present loads of varying voltage and power requirements. The multiple dual mode voltage regulators may operate from a common input voltage that is available to the SoC.

Figure 2:
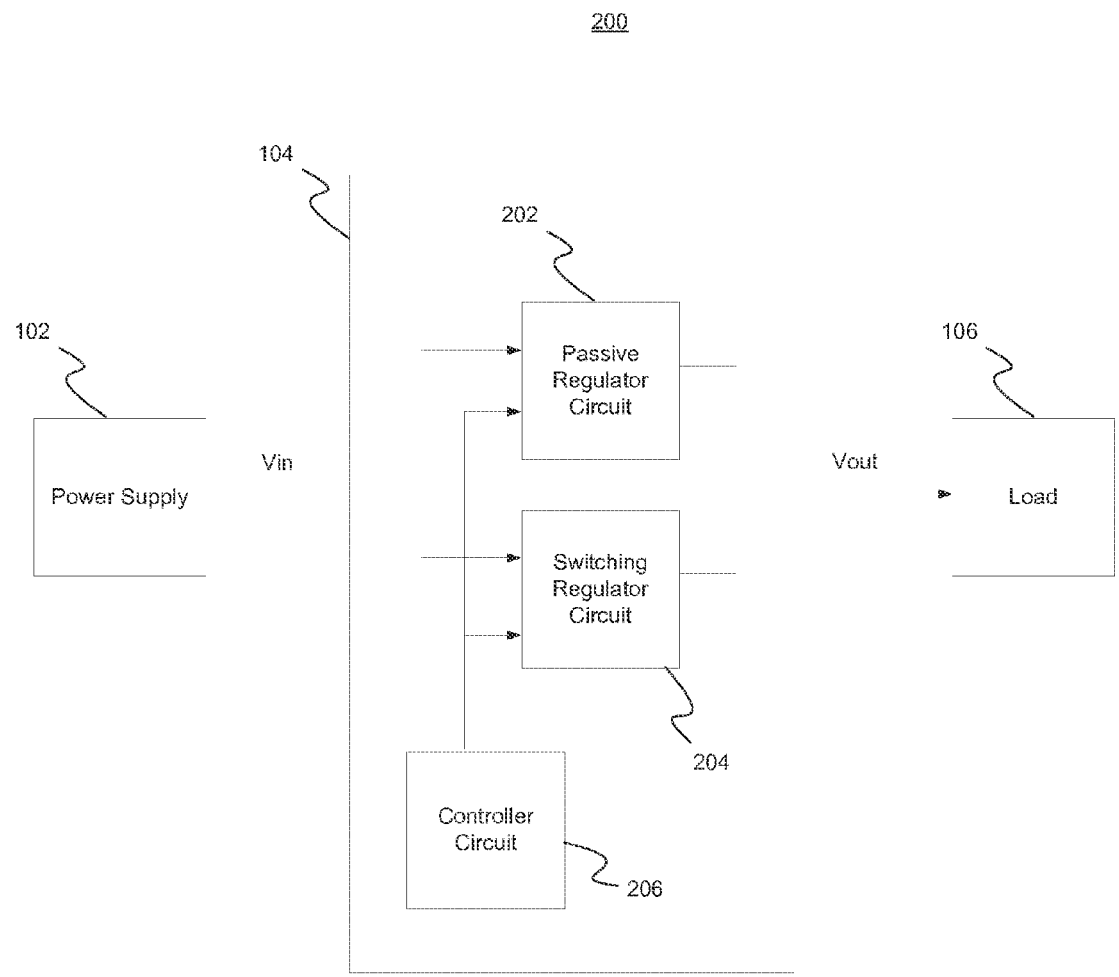
FIG. 2 illustrates a system diagram of one exemplary embodiment consistent with the present disclosure.

FIG. 2 illustrates a system diagram 200 of one exemplary embodiment consistent with the present disclosure. Dual mode voltage regulator 104 is shown to comprise a controller circuit 206, a passive regulator circuit 202 and a switching regulator circuit 204. Controller circuit 206 monitors operational parameters of the system, as will be described in greater detail below, and selectively couples a line voltage, Vin, to an output voltage port, Vout, through either passive regulator circuit 202 or switching regulator circuit 204.

Passive regulator circuit 202 may be a low drop-out (LDO) voltage regulator or other suitable passive voltage regulator. Passive voltage regulators generally operate by controlling current flow from the Vin port to the Vout port through a pass gate which may, for example, be a bipolar junction transistor (BJT) of a field effect transistor (FET). The gating signal for the pass gate may be derived from a differential amplifier (or error amplifier) that monitors the difference between Vout and a desired reference voltage Vref. Passive voltage regulators are typically capable of operating under conditions of reduced voltage differential between Vin and Vout, but they suffer from decreasing power conversion efficiency (the ratio of power out to power in) as the difference between Vin and Vout increases. Passive voltage regulators generally do not require a clock or other timing signal for their operation. This can be an advantage since a system clock is not always available, particularly during a system power up.

Switching regulator circuit 204 may be a buck voltage regulator or other suitable switching mode voltage regulator. Switching mode voltage regulators generally offer increased power conversion efficiency at higher load currents. Switching mode voltage regulators operate by switching current provided by the input power supply on and off at periodic intervals with a duty cycle for pulse width modulation) that results in a desired voltage level conversion. For example, a 50 percent duty cycle may provide an output voltage to the load that is approximately one half of the input power supply line voltage. The pulse width modulated signal is typically processed by a filter at the output load, for example an inductor-capacitor network, to provide a DC output voltage waveform. The current switching may be performed by one or more switches, for example BJTs or FETs. The modulation rate or duty cycle may be dynamically adjusted by monitoring the difference between Vout and a desired reference voltage Vref. Although it may be possible to improve the power conversion efficiency of switching mode voltage regulators operating at reduced load currents, these techniques increase circuit complexity and cost. Additionally, switching mode voltage regulators often require a system clock signal to operate since the modulation timing is typically derived from the system clock.

Figure 3:
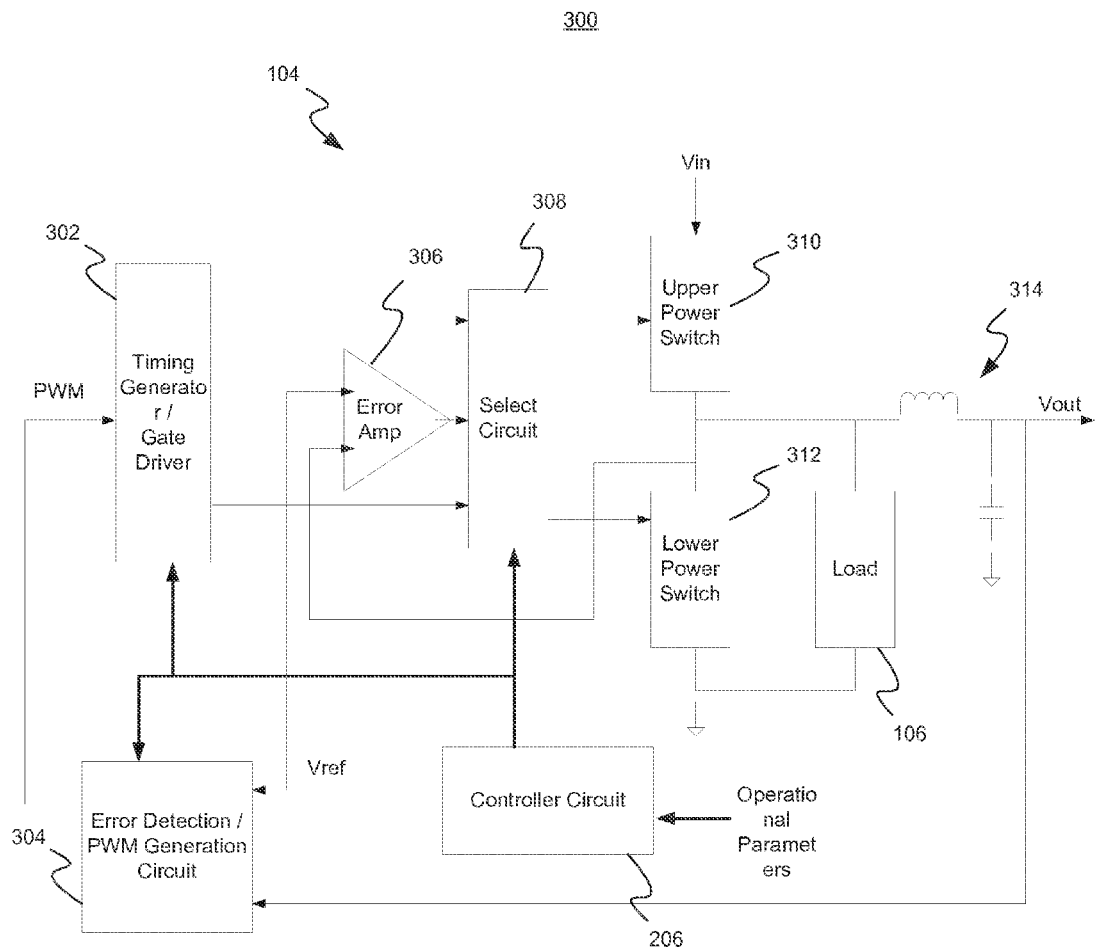
FIG. 3 illustrates a more detailed block diagram of one exemplary embodiment consistent with the present disclosure.

FIG. 3 illustrates a more detailed block diagram 300 of one exemplary embodiment consistent with the present disclosure. Dual mode voltage regulator 104 is shown providing output voltage to load 106. Controller circuit 206 monitors operational parameters which may include input voltage Vin, output voltage Vout, current through load 106, generated timing and switching signals as well as the presence or absence of a system clock. Controller circuit 206 is coupled to error detection/PWM generation circuit 304, timing generator/gate driver 302, and selection circuit 308, the operation of which will be explained in greater detail below. Error amplifier 306 provides feedback based on the difference between the converted output voltage and the desired output voltage as represented by a provided reference voltage Vref. Upper and lower power switches 310, 312, which may be BJTs, FETs or other suitable types of power switches, are shown. The upper power switch 310 may also serve as a pass gate during passive (LDO) mode operation. Inductor-capacitor filter network 314, provided to smooth the output voltage, is also shown.

The controller circuit 206, based on determined operating conditions, may advantageously configure the dual mode voltage regulator 104 to operate in the mode best suited for the operating condition. For example, if the load current is measured below a pre-determined threshold, the controller circuit 206 may configure the regulator to operate in the LDO (or passive) mode rather than the Buck (or switched) mode. As another example, the controller circuit 206 may determine that the ratio of load voltage to input (or line) voltage is below a second pre-determined threshold, wherein a higher power conversion efficiency may be obtained by configuring the regulator to operate in the LDO mode rather than the Buck mode. In some embodiments, the controller circuit 206 may determine that a system clock is not present, as may occur during a system boot, in which case the controller may configure the regulator to operate in the LDO mode.

The configuration of the regulator may be dynamically adjusted during operation based on time-varying conditions. In some embodiments, the pre-determined thresholds, as used for decision making comparisons, may also be dynamically adjusted based on changing conditions or operational requirements.

The error detection/PWM generation circuit 304 may be employed during Buck mode operation to compare the output voltage Vout to the reference voltage Vref and adjust the PWM to attempt compensate for any difference. The PWM signal may then be employed by the timing generator/gate driver circuit 302 to generate the timing signals corresponding to mark and space times that will drive the upper and lower power switches 310, 312. The selection circuit 308 determines, based on the current mode configuration, whether the signals from timing generator/gate driver circuit 302 will drive the power switches (in Buck mode) or whether the error amplifier 306 output will drive the upper power switch 310 as a pass gate (in LDO mode).

In some embodiments, the transition between the two modes of operation may be synchronized by the controller circuit 206 to reduce load voltage perturbations associated with the mode change. For example, transitioning from Buck mode to LDO mode may include any or all of the following. The transition may be synchronized with the Buck clock frequency such that the LIDO mode is enabled at the end of a Buck clock cycle. The LDO mode may be enabled prior to the transition, employing a dummy pass gate and load such that the LDO load voltage may stabilize at the desired voltage prior to the transition. A common voltage reference signal may be used for both modes of operation to reduce any error differences between the modes. During LDO mode, the Buck PWM on/off timing (or mark to space ratio) may be stored to facilitate a future transition back to Buck mode.

Similarly, transitioning from LDO mode to Buck mode may include any or all of the following. The transition may be synchronized with the Buck clock frequency such that the Buck mode is enabled at the start of a Buck clock cycle. The Buck PWM mark to space ratio may be the ratio that was stored prior to a previous transition to LDO mode or it may be a predictive ratio based on, for example, a given load current and/or line to load voltage ratio. The controller response may be damped to suppress load voltage perturbation due to error differences between LDO mode and Buck mode output voltages. This may be accomplished, for example, by reducing the bandwidth of feedback loops in the controller circuit to increase the response time to changing inputs. The transition from LDO mode to Buck mode may include an intermediate mode such as pulse frequency modulation (PPM) or asynchronous drift to reduce load perturbation.

The controller circuit 206 may de-power some or all components that are exclusively associated with the mode that is not in use to reduce power dissipation. Some components may be shared between modes, however, such as, for example, the upper power switch 310 and the error amplifier 306.

In some embodiments, the controller circuit 206 may be configured to power up in LDO mode as a default, thus enabling power up in the absence of a system clock as may occur during a boot up of an SoC implementation.

Figure 4:
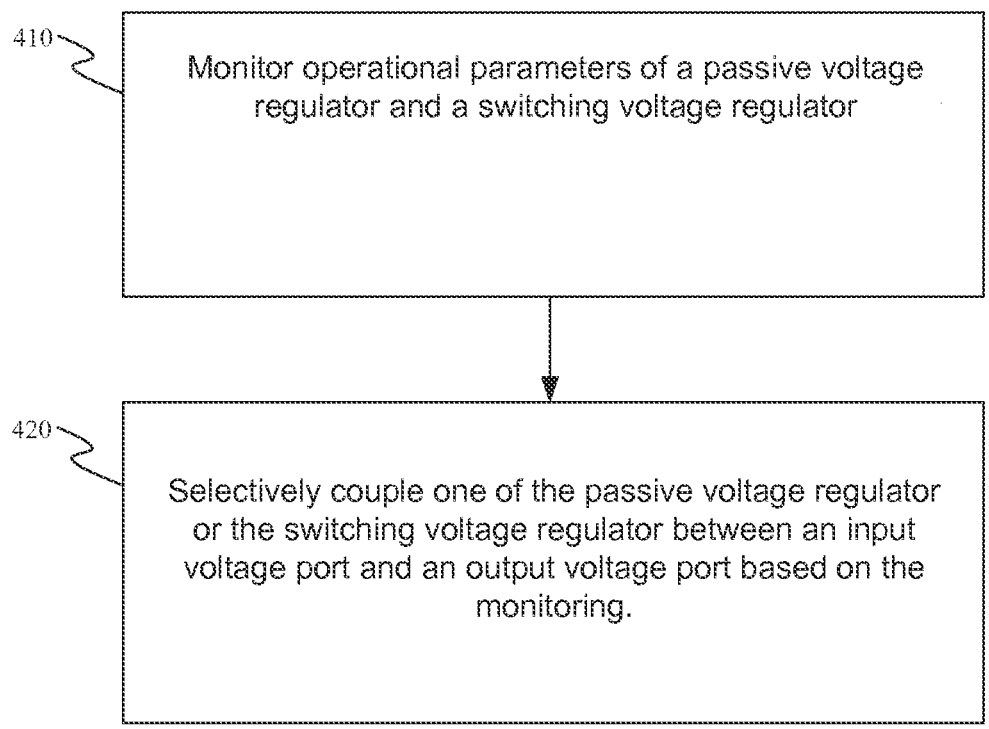
FIG. 4 illustrates a flowchart of operations of one exemplary embodiment consistent with the present disclosure.

FIG. 4 illustrates a flowchart of operations 400 of one exemplary embodiment consistent with the present disclosure. At operation 410, operational parameters of a passive voltage regulator and a switching voltage regulator are monitored. The parameters may include voltage at the input voltage port, voltage at the output voltage port, current through a load coupled to the output voltage port and the presence or absence of a system clock signal. At operation 420, one of the passive voltage regulator or the switching regulator is selectively coupled between an input voltage port and an output voltage port, based on the monitoring. In some embodiments components may be shared between the passive voltage regulator and the switching voltage regulator.

Figure 5:
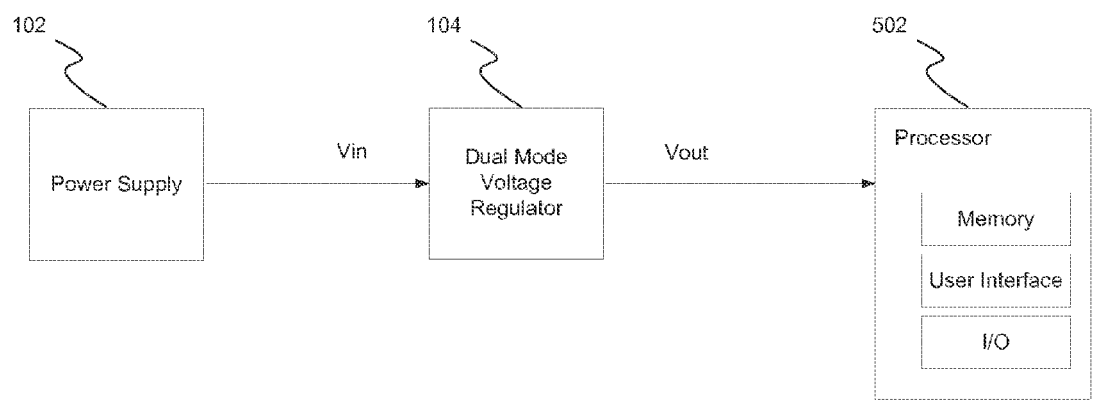
FIG. 5 illustrates a top level system diagram of another exemplary embodiment consistent with the present disclosure.

FIG. 5 illustrates a top level system diagram 500 of another exemplary embodiment consistent with the present disclosure. A power supply 102 provides input power at a direct current (DC) voltage level to a dual mode voltage regulator 104. Dual mode voltage regulator 104 converts the input DC voltage level to a desired output voltage level. Processor 502 is shown coupled to an output voltage port of dual mode voltage regulator 104 which may provide power to processor 502 at that converted voltage level. Processor 502 may comprise a memory, a user interface, input/output modules and/or other suitable components.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMS, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, iii the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A dual mode voltage regulator, comprising:
   an input voltage port;
   an output voltage port;
   a passive regulator circuit;
   a switching regulator circuit; and
   a controller circuit to monitor operational parameters of said dual mode voltage regulator and selectively couple one of said passive regulator circuit and said switching regulator circuit between said input voltage port and said output voltage port, said selective coupling based on said monitoring; and
   wherein the controller circuit also to synchronize a first transition from the switching regulator circuit to the passive regulator circuit so that the first transition occurs at an end of a clock cycle of the switching regulator circuit, and to synchronize a second transition from the passive regulator circuit to the switching regulator circuit so that the second transition occurs at a start of the clock cycle of the switching regulator circuit.

2. The dual mode voltage regulator of claim 1, wherein said switching regulator circuit comprises an upper power switch coupled between said input voltage port and said output voltage port; and a lower power switch coupled between said output voltage port and a ground; and wherein said passive regulator circuit is configured to control a pass gate, said pass gate employing said upper power switch of said switching regulator.

3. The dual mode voltage regulator of claim 2, further comprising timing generation circuitry configured to provide a pulse width modulated (PWM) gating signal to said upper power switch and said lower power switch, and wherein the first and second transition of said selective coupling is synchronized with said PWM gating signal.

4. The dual mode voltage regulator of claim 1, wherein said operational parameters include at least one of voltage at said input voltage port, voltage at said output voltage port, current through a load coupled to said output voltage port and presence of a system clock signal.

5. The dual mode voltage regulator of claim 1, wherein said controller circuit is further configured to couple said switching regulator circuit between said input voltage port and said output voltage port in response to determining that a current through said load exceeds a first pre-determined threshold.

6. The dual mode voltage regulator of claim 1, wherein said controller circuit is further configured to couple said passive regulator circuit between said input voltage port and said output voltage port in response to detecting the absence of a system clock signal.

7. The dual mode voltage regulator of claim 1, wherein said controller circuit is further configured to couple said switching regulator circuit between said input voltage port and said output voltage port in response to determining that a ratio of a voltage at said input voltage port to a voltage at said output voltage port exceeds a second pre-determined threshold.

8. The dual mode voltage regulator of claim 1, wherein said switching regulator circuit is configured as a buck voltage regulator and said passive regulator circuit is configured as a low drop-out (LDO) voltage regulator.

9. A method for providing dual mode voltage regulation, said method comprising:
   monitoring operational parameters of a passive voltage regulator and a switching voltage regulator;
   selectively coupling one of said passive voltage regulator and said switching voltage regulator between an input voltage port and an output voltage port, said selective coupling based on said monitoring;
   synchronizing a first transition from the switching regulator circuit to the passive regulator circuit so that the first transition occurs at an end of a clock cycle of the switching regulator circuit, and
   synchronizing a second transition from the passive regulator circuit to the switching regulator circuit so that the second transition occurs at a start of the clock cycle of the switching regulator circuit.

10. The method of claim 9, wherein said operational parameters include at least one of voltage at said input voltage port, voltage at said output voltage port, current through a load coupled to said output voltage port and presence of a system clock signal.

11. The method of claim 9, further comprising providing a switch that is operable as a power switch associated with said switching voltage regulator and as a pass gate associated with said passive voltage regulator.

12. The method of claim 11, further comprising generating a PWM gating signal to control said switch and the first and second transitioning of said selective coupling is in synchronization with said PWM gating signal.

13. The method of claim 9, further comprising coupling said switching voltage regulator between said input voltage port and said output voltage port in response to determining that a current through a load coupled to said output voltage port exceeds a first pre-determined threshold.

14. The method of claim 9, further comprising coupling said passive voltage regulator between said input voltage port and said output voltage port in response to detecting the absence of a system clock signal.

15. The method of claim 9, further comprising coupling said switching voltage regulator between said input voltage port and said output voltage port in response to determining that a ratio of a voltage at said input voltage port to a voltage at said output voltage port exceeds a second pre-determined threshold.

16. A computer-readable storage device having instructions stored thereon which when executed by a processor result in the following operations for providing dual mode voltage regulation, said operations comprising:

monitor operational parameters of a passive voltage regulator and a switching voltage regulator;

selectively coupling one of said passive voltage regulator and said switching voltage regulator between an input voltage port and an output voltage port, said selective coupling based on said monitoring;

synchronize a first transition from the switching regulator circuit to the passive regulator circuit so that the first transition occurs at an end of a clock cycle of the switching regulator circuit, and synchronize a second transition from the passive regulator circuit to the switching regulator circuit so that the second transition occurs at a start of the clock cycle of the switching regulator circuit.

17. The computer-readable storage device of claim 16, wherein said operational parameters include at least one of voltage at said input voltage port, voltage at said output voltage port, current through a load coupled to said output voltage port and presence of a system clock signal.

18. The computer-readable storage device of claim 16, wherein said operations further comprise generating a PWM gating signal to control said switching voltage regulator and transitioning said selective coupling in synchronization with said PWM gating signal.

19. The computer-readable storage device of claim 16, wherein said operations further comprise coupling said switching voltage regulator between said input voltage port and said output voltage port in response to determining that a current through a load coupled to said output voltage port exceeds a first pre-determined threshold.

20. The computer-readable storage device of claim 16, wherein said operations further comprise coupling said passive voltage regulator between said input voltage port and said output voltage port in response to detecting the absence of a system clock signal.

21. The computer-readable storage device of claim 16, wherein said operations further comprise coupling said switching voltage regulator between said input voltage port and said output voltage port in response to determining that a ratio of a voltage at said input voltage port to a voltage at said output voltage port exceeds a second pre-determined threshold.

22. An apparatus comprising a dual mode voltage regulator and a processor, said apparatus comprising:

an input voltage port associated with said dual mode voltage regulator;

an output voltage port associated with said dual mode voltage regulator;

a passive regulator circuit associated with said dual mode voltage regulator;

a switching regulator circuit associated with said dual mode voltage regulator;

a controller circuit associated with said dual mode voltage regulator, said controller circuit configured to monitor operational parameters of said dual mode voltage regulator and selectively couple one of said passive regulator circuit and said switching regulator circuit between said input voltage port and said output voltage port, said selective coupling based on said monitoring; wherein the controller circuit also to synchronize a first transition from the switching regulator circuit to the passive regulator circuit so that the first transition occurs at an end of a clock cycle of the switching regulator circuit, and to synchronize a second transition from the passive regulator circuit to the switching regulator circuit so that the second transition occurs at a start of the clock cycle of the switching regulator circuit;

and a processor coupled to said dual mode voltage regulator.

23. The apparatus of claim 22, wherein said processor is configured to receive power from said output voltage port of said dual mode voltage regulator.

24. The apparatus of claim 22, wherein said switching regulator circuit comprises an upper power switch coupled between said input voltage port and said output voltage port; and a lower power switch coupled between said output voltage port and a ground; and wherein said passive regulator circuit is configured to control a pass gate, said pass gate employing said upper power switch of said switching regulator.

25. The apparatus of claim 24, further comprising timing generation circuitry configured to provide a pulse width modulated (PWM) gating signal to said upper power switch and said lower power switch, and wherein the first and second transition of said selective coupling is synchronized with said PWM gating signal.

26. The apparatus of claim 22, wherein said operational parameters include at least one of voltage at said input voltage port, voltage at said output voltage port, current through a load coupled to said output voltage port and presence of a system clock signal.

27. The apparatus of claim 22, wherein said controller circuit is further configured to couple said switching regulator circuit between said input voltage port and said output voltage port in response to determining that a current through said load exceeds a first pre-determined threshold.

28. The apparatus of claim 22, wherein said controller circuit is further configured to couple said passive regulator circuit between said input voltage port and said output voltage port in response to detecting the absence of a system clock signal.

29. The apparatus of claim 22, wherein said controller circuit is further configured to couple said switching regulator circuit between said input voltage port and said output voltage port in response to determining that a ratio of a voltage at said input voltage port to a voltage at said output voltage port exceeds a second pre-determined threshold.

30. The apparatus of claim 22, wherein said switching regulator circuit is configured as a buck voltage regulator and said passive regulator circuit is configured as a low drop-out (LDO) voltage regulator.

* * * * *